United States Patent
Norem et al.

(10) Patent No.: US 9,080,710 B2
(45) Date of Patent: Jul. 14, 2015

(54) ACCUMULATOR RESERVOIR VENTING

(75) Inventors: Dean A. Norem, Cherry Valley, IL (US); Tye L. Klipp, Roscoe, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 156 days.

(21) Appl. No.: 13/153,533

(22) Filed: Jun. 6, 2011

(65) Prior Publication Data

US 2012/0186653 A1 Jul. 26, 2012

Related U.S. Application Data

(60) Provisional application No. 61/434,930, filed on Jan. 21, 2011.

(51) Int. Cl.
*F16L 55/04* (2006.01)
*F16L 55/053* (2006.01)

(52) U.S. Cl.
CPC .......... *F16L 55/053* (2013.01); *F15B 2201/205* (2013.01); *F15B 2201/31* (2013.01); *F15B 2201/415* (2013.01)

(58) Field of Classification Search
CPC ................... F15B 2201/205; F15B 2201/312; F15B 1/24; F15B 2201/4155; F16L 55/053
USPC ............. 138/126, 127, 128, 130, 131, 26–28, 138/30, 31; 303/10–11; 417/540
See application file for complete search history.

(56) References Cited

U.S. PATENT DOCUMENTS

| | | | | |
|---|---|---|---|---|
| 2,721,446 A | | 10/1955 | Bumb | |
| 2,742,929 A | * | 4/1956 | Treseder | 138/31 |
| 3,015,345 A | * | 1/1962 | Vilo | 138/31 |
| 3,018,627 A | * | 1/1962 | Perricci | 60/634 |
| 3,047,023 A | * | 7/1962 | Dick | 138/31 |
| 3,174,432 A | * | 3/1965 | Eickmann | 417/339 |
| 3,363,513 A | * | 1/1968 | Ottestad | 91/5 |
| 3,414,278 A | * | 12/1968 | Schmid | 280/5.514 |
| 3,424,202 A | * | 1/1969 | Lincicome | 138/31 |
| 3,542,387 A | * | 11/1970 | Schmid | 180/41 |
| 3,673,028 A | * | 6/1972 | Pearson | 156/172 |
| 3,677,334 A | * | 7/1972 | Bathla et al. | 165/11.1 |
| 3,714,964 A | * | 2/1973 | Livingston | 137/513.3 |
| 3,863,676 A | * | 2/1975 | Tarsha | 138/31 |
| 3,907,001 A | | 9/1975 | Vanderlaan et al. | |
| 4,376,619 A | * | 3/1983 | Haushalter et al. | 417/540 |
| 4,497,495 A | * | 2/1985 | Christiansen | 277/349 |
| 4,538,972 A | * | 9/1985 | Gooden | 417/540 |
| 4,606,376 A | * | 8/1986 | Bernard et al. | 138/30 |

(Continued)

FOREIGN PATENT DOCUMENTS

| | | |
|---|---|---|
| DE | 10224675 | 12/2003 |
| GB | 2420380 | 5/2006 |

OTHER PUBLICATIONS

Search Report, GB1112418.7, dated Nov. 14, 2011.

*Primary Examiner* — Patrick F Brinson
*Assistant Examiner* — Matthew Lembo
(74) *Attorney, Agent, or Firm* — Carlson, Gaskey & Olds, P.C.

(57) ABSTRACT

An example accumulator reservoir includes a housing. The housing contains a system fluid chamber, a working fluid chamber, and a residual chamber. Vent paths are configured to vent fluid from the residual chamber. Each of the vent paths extends nonlinearly between a first opening and a second opening.

22 Claims, 4 Drawing Sheets

(56) References Cited

U.S. PATENT DOCUMENTS

| | | | |
|---|---|---|---|
| 4,693,276 A * | 9/1987 | Fulmer | 138/31 |
| 4,695,226 A | 9/1987 | Marchitto et al. | |
| 4,745,745 A * | 5/1988 | Hagin | 60/414 |
| 4,881,725 A * | 11/1989 | Shioda et al. | 267/179 |
| 4,906,166 A | 3/1990 | Seidel | |
| 5,020,322 A | 6/1991 | Schwarz | |
| 5,165,232 A | 11/1992 | Amelio et al. | |
| 5,771,936 A * | 6/1998 | Sasaki et al. | 138/31 |
| 5,809,801 A | 9/1998 | Cates, Jr. et al. | |
| 5,897,095 A * | 4/1999 | Hickey | 251/57 |
| 6,003,555 A * | 12/1999 | Sheng | 138/31 |
| 6,056,013 A * | 5/2000 | Sasaki et al. | 138/31 |
| 6,120,931 A * | 9/2000 | Fossati et al. | 429/72 |
| 6,266,959 B1 | 7/2001 | Markwart | |
| 6,298,877 B1 * | 10/2001 | Inuki et al. | 137/625.11 |
| 6,390,133 B1 | 5/2002 | Patterson et al. | |
| 6,547,862 B2 | 4/2003 | Dean | |
| 6,634,386 B1 * | 10/2003 | Maloney et al. | 138/31 |
| 6,851,349 B2 * | 2/2005 | Dohallow | 91/169 |
| 6,923,215 B2 * | 8/2005 | Weber | 138/31 |
| 6,978,825 B1 * | 12/2005 | Baylot et al. | 165/45 |
| 7,493,916 B2 * | 2/2009 | Rose | 138/30 |
| 7,971,608 B2 * | 7/2011 | Crimpita | 138/31 |
| 2003/0075225 A1 * | 4/2003 | Dinkel et al. | 138/31 |
| 2005/0028879 A1 * | 2/2005 | Suzuki | 138/26 |
| 2005/0236413 A1 * | 10/2005 | Maciag et al. | 220/256.1 |
| 2008/0308168 A1 * | 12/2008 | O'Brien et al. | 138/31 |
| 2010/0083726 A1 * | 4/2010 | Cotter | 72/361 |
| 2010/0186843 A1 * | 7/2010 | Wellner et al. | 138/30 |
| 2010/0206389 A1 * | 8/2010 | Kennedy et al. | 137/14 |
| 2012/0097021 A1 * | 4/2012 | Short et al. | 91/4 R |

* cited by examiner

ACCUMULATOR RESERVOIR VENTING

CROSS-REFERENCE TO RELATED APPLICATIONS

This disclosure claims priority to U.S. Provisional Application No. 61/434,930, which was filed on 21 Jan. 2011 and is incorporated herein by reference.

BACKGROUND

This disclosure relates generally to venting and, more particularly, to venting an accumulator reservoir.

Accumulator reservoirs are well known. Many closed loop cooling systems include a pump that circulates fluid. The accumulator reservoir is used to maintain fluid pressure on the inlet side of the circulation pump. There are various types of accumulator reservoirs, such as bootstrap, bellows, gas charged, etc.

In a bootstrap accumulator reservoir, a main piston moves within a housing to accommodate changes in the volume of a system fluid within the housing. A pump within the system discharges a working fluid that is used to pressurize an actuator cylinder of the bootstrap accumulator reservoir. The actuator cylinder opposes movement of the main piston.

Venting areas of the accumulator is often necessary. Venting allows air or fluid to move in and out of areas of the accumulator as the main piston moves within the housing. Venting prevents the compressible air from affecting pressure balance on the main piston, and facilitates smooth movement of the main piston within the housing. Contaminants can undesirably enter the accumulator reservoir through such a vent. Contaminants can negatively affect the performance of seals and smooth action of the accumulator reservoir.

SUMMARY

An example accumulator reservoir includes a housing. The housing contains a system fluid chamber, a working fluid chamber, and a residual chamber. Vent paths are configured to vent fluid from the residual chamber. Each of the vent paths extends nonlinearly between a first opening and a second opening. The fluid is air in one example.

Another example accumulator reservoir includes a housing and a main piston received within the housing. An actuator chamber is on a first side of the main piston. A residual chamber is also on the first side of the main piston. An accumulator reservoir chamber is on an opposing, second side of the main piston. Crooked vent paths are configured to vent fluid from the residual chamber. The fluid is air in one example.

The example method of venting an accumulator reservoir to restrict ingress of contaminants includes communicating fluid between a chamber within the accumulator reservoir and an outside environment through a plurality of crooked vent paths. The chamber is separate from a system fluid chamber and a working fluid chamber. The fluid is air in one example.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
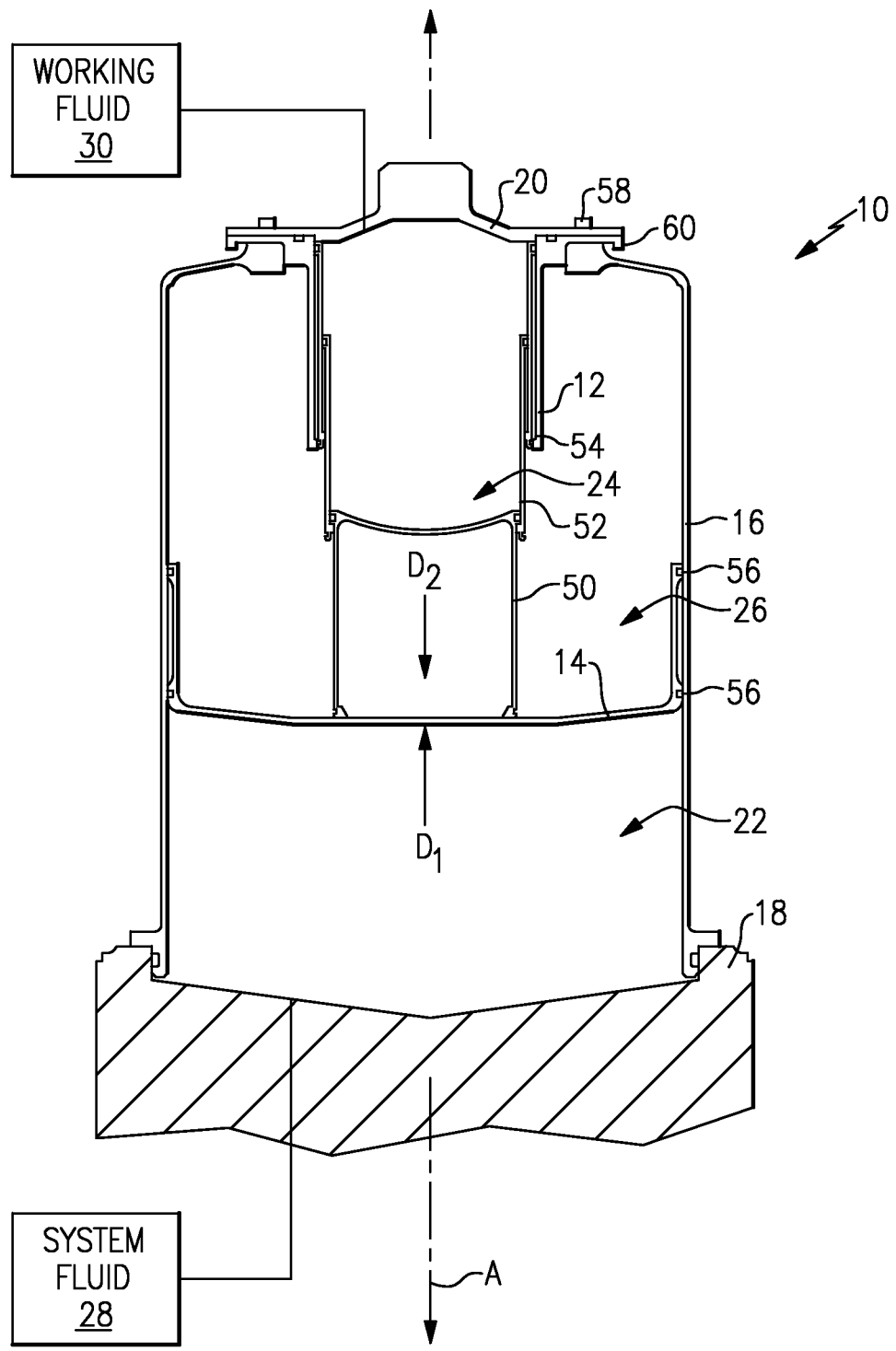
FIG. 1 shows a section view of an example boot strap accumulator reservoir.
Figure 2:
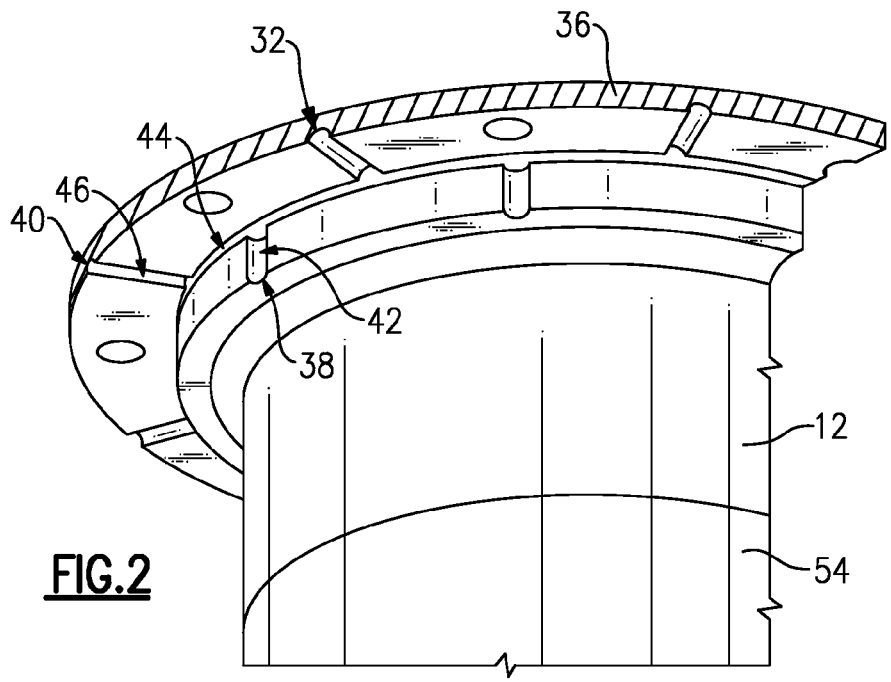
FIG. 2 shows a perspective view of a portion of an actuator cylinder base of the FIG. 1 accumulator reservoir.
Figure 3:
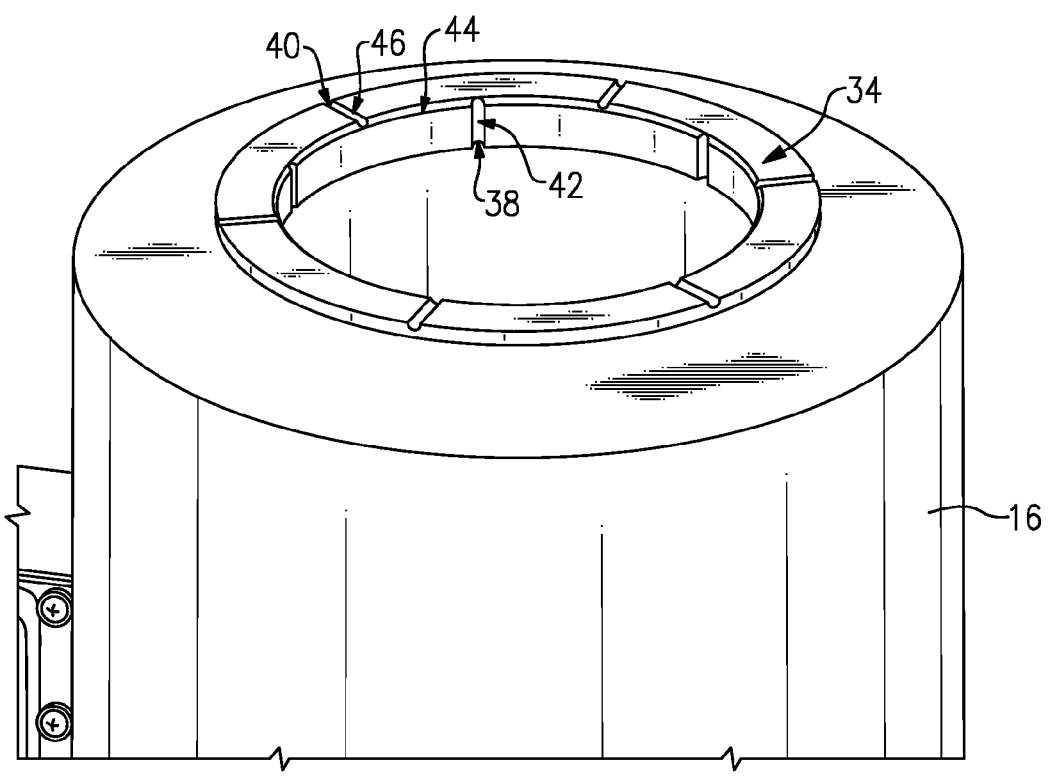
FIG. 3 shows a perspective view of a portion of a reservoir housing of the FIG. 1 accumulator reservoir.
Figure 4:
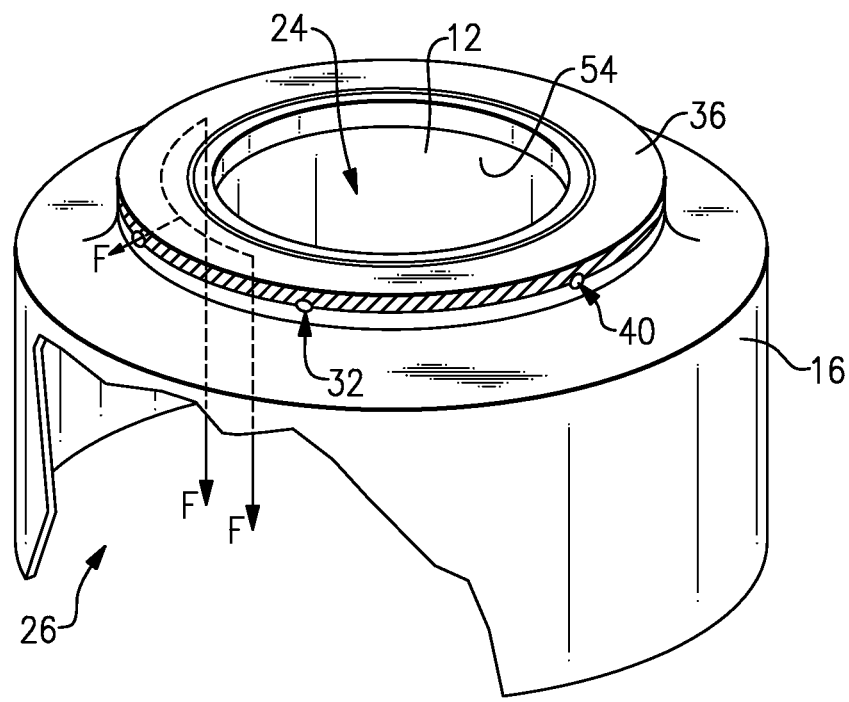
FIG. 4 shows a perspective view of portions of the accumulator reservoir, with items of FIGS. 2 and 3 assembled together.
Figure 5:
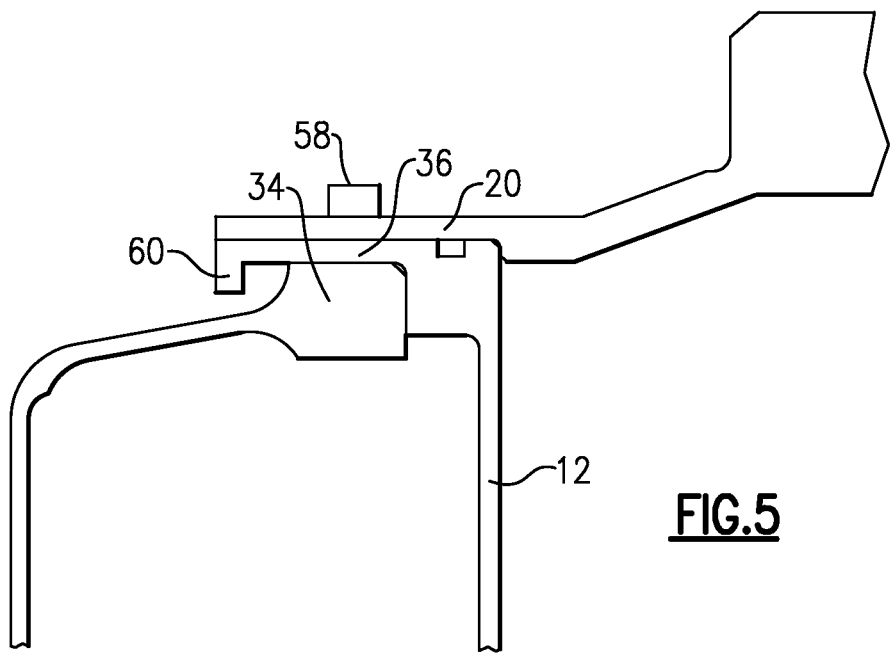
FIG. 5 shows a close-up section view of a portion of the FIG. 1 accumulator reservoir.

Referring to FIG. 1, an example accumulator reservoir 10 includes an actuator cylinder base 12 and a main piston 14 received within a reservoir housing 16. A first axial end of the housing 16 is sealed and secured directly to a base 18. An opposing axial end of the housing 16 is covered by a cap 20. The housing 16 extends along an axis A and is generally cylindrical. The accumulator reservoir 10 is a bootstrap accumulator reservoir in this example.

The accumulator reservoir 10 includes a system fluid chamber 22 on one side of the main piston 14. A working fluid chamber 24 and a residual chamber 26 are included on an opposing side of the main piston 14.

During operation, a system fluid may leak, expand, or contract, and require communication to and from the system fluid chamber 22. A system fluid supply 28 provides the system fluid. Adding system fluid to the system fluid chamber 22 urges the main piston 14 upward in an axial direction $D_1$.

A working fluid also communicates to and from the working fluid chamber 24. A working fluid supply 30, such as a pump discharge, provides the working fluid. Adding working fluid to the working fluid chamber 24 urges the actuator cylinder 12 downward in an axial direction $D_2$. As can be appreciated, urging the actuator cylinder 12 downward causes the actuator cylinder 12 to oppose the upward movement of the main piston 14. The actuator cylinder 12 thus helps the main piston 14 maintain pressure on the system fluid.

As the main piston 14 moves upward in the direction $D_1$, the residual chamber 26 is compressed. As the main piston 14 moves downward in the direction $D_2$, the residual chamber 26 is expanded. The example residual chamber 26 is annular and is typically filled with a compressible fluid, such as air during operation of the accumulator reservoir 10. The residual chamber 26 is vented so that fluid can communicate to and from the residual chamber 26 as needed. Venting the residual chamber 26 ensures that any pressure exerted by the fluid in the residual chamber 26 does not substantially influence pressure balance, or controlled movement of the main piston 14 relative to the housing 16.

Referring now to FIGS. 2-5 with continuing reference to FIG. 1, a plurality of vent paths 32 are used to communicate fluid to and from the residual chamber 26. The example vent paths 32 are established by a collar 34 of the housing 16 and a radial flange 36 of the actuator cylinder 12. In this example, the vent paths 32 are arranged in a circular array about the axis A.

The example vent paths 32 extend from an arrangement of first openings 38 to an arrangement of second openings 40. The first openings 38 interface directly with the residual chamber 26. The second openings 40 interface directly with an environment surrounding the accumulator reservoir 10.

These path segments all interconnect with the annular path formed by the edge chamfer 44.

The example vent paths 32 include axially directed segments 42, circumferentially directed segments 44, and radially directed segments 46. For a fluid to move between the residual chamber 26 and a surrounding environment, the air must move, at a minimum, through one of the axially directed segments 42, one of the circumferentially directed segments 44, and one of the radially directed segments 46. This multitude of paths can and will operate in parallel and provide an interconnected network of vent flows, making the system resistant to blockage.

The example vent paths 32 are thus nonlinear as fluid communicated along the vent paths 32 does not travel between the arrangement of first openings 38 and the arrangement of second openings 40 in a straight line. The vent paths 32 are considered crooked in some examples, and the fluid is considered to have a tortured flow path. A direction of flow F through some of the portions of the vent paths 32 is shown generally in FIG. 4.

In this example, the vent paths 32 include six axially directed segments 42 that are evenly circumferentially distributed about the axis. Also, the example vent paths 32 include six radially directed segments 46 that are evenly circumferentially distributed about the axis.

Although the example vent paths 32 are described as having portions defined by both the actuator cylinder 12 and the housing 16, those having skill in the art and the benefit of this disclosure will understand that either the actuator cylinder 12 or the housing 16 alone may define the vent paths 32.

Figure 6:
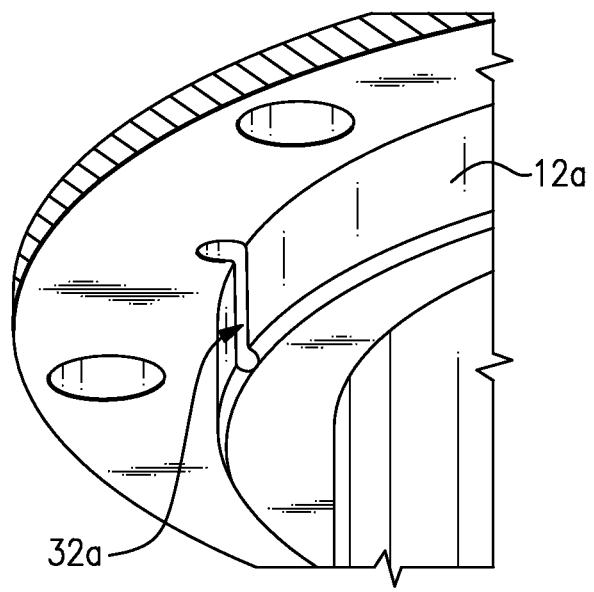
FIG. 6 shows a perspective view of another example actuator cylinder base.
Figure 7:
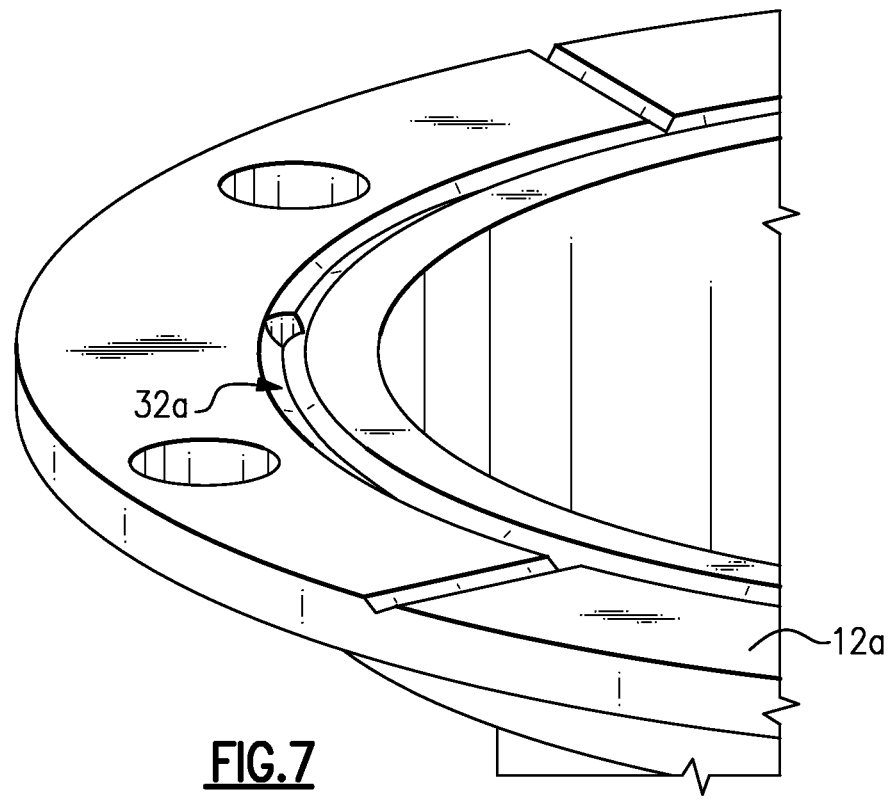
FIG. 7 shows another perspective view of the FIG. 6 actuator cylinder base.

Also, other components may be used to establish the vent paths 32. For example, in another accumulator reservoir, vent paths could be established by the cap 20 and the actuator cylinder 12. In yet another example, vent paths could be established by the housing 16, the actuator cylinder 12, and the cap 20. FIGS. 6 and 7 show example vent paths 32a that are established between the cap 20 and a flange 36a of an actuator cylinder 12a. Notably, the machined portions dedicated to establishing the vent paths 32a are exclusively in the actuator cylinder 12a.

Referring again to FIGS. 1-5, the example actuator cylinder 12 is a telescoping actuator cylinder that includes an inner sleeve 50, a mid sleeve 52, and an outer sleeve 54. As can be appreciated, the inner sleeve 50 is received within the mid sleeve 52 and the outer sleeve 54 as the actuator cylinder 12 is compressed due to movement of the main piston in the direction $D_1$. Seals may be used to seal interfaces between the sleeves 50-54. The main piston 14 also uses seals 56 to seal interfaces between the main piston 14 and an inner wall of the housing 16.

The cap 20 is secured directly to the flange 36 and the collar 34 of the housing 16 with a plurality of bolts 58. The cap 20 covers and seals the working fluid chamber 24.

Notably, the example actuator cylinder base 12 also includes a lip 60 extending downwardly from the radially extending flange 36. The downwardly extending lip 60 extends in the direction $D_2$ past the second openings 40. The lip 60 shields the openings 40 from directly jetted fluids or particulates of the surroundings. The cap 20 may establish the lip 60 in some examples, such as when the vent paths 32a are established between the cap 20 and the flange 36a.

Features of the disclosed example include venting an accumulator through crooked paths to discourage contaminants from entering the residual chamber. Another feature is the downwardly extending lip, which also discourages contaminants from entering the vent paths. Yet another feature is distributing the vents circumferentially.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. An accumulator reservoir, comprising:
a housing containing at least a system fluid chamber, a working fluid chamber, and a residual chamber disposed along an axis, at least a portion of the working fluid chamber axially aligned with at least a portion of the residual chamber;
a plurality of vent paths configured to vent the residual chamber in response to a variation in a volume of the residual chamber, wherein each of the plurality of vent paths extend nonlinearly between a first opening and a second opening, the first opening and the second opening each having a circumferentially continuous perimeter; and
an actuator cylinder, wherein the plurality of vent paths are established between the actuator cylinder and the housing, wherein the plurality of vent paths are defined on at least one of the actuator cylinder or the housing, wherein the residual chamber is annular and the working fluid chamber is received within the residual chamber.

2. The accumulator reservoir of claim 1, including an actuator cylinder and an actuator cap, wherein the plurality of vent paths are established entirely within at least one of the housing, the actuator cylinder, or the actuator cap.

3. The accumulator reservoir of claim 1, wherein the plurality of vent paths are arranged in a circular array about an axis of the accumulator reservoir.

4. The accumulator reservoir of claim 1, wherein the plurality of vent paths are crooked.

5. The accumulator reservoir of claim 1, including an actuator cylinder base having a flange that establishes at least a portion of the plurality of vent paths, the flange further having a lip configured to block contaminate ingress into the plurality of vent paths.

6. The accumulator reservoir of claim 5, wherein the lip extends downwardly.

7. The accumulator reservoir of claim 1, wherein the first opening is in direct fluid communication with the residual chamber, and the second opening is in direct fluid communication with atmosphere.

8. The accumulator reservoir of claim 1, including a piston moveable along an axis, the working fluid chamber and the residual chamber located exclusively on a first axial side of the piston, the system fluid chamber located exclusively on an opposing, second axial side of the piston.

9. A vented accumulator reservoir, comprising:
a housing;
a main piston received within the housing;
a working fluid chamber on a first side of the main piston;
a residual chamber on the first side of the main piston, the residual chamber having a volume that varies in response to movement of the main piston, the residual chamber receiving and surrounding at least a portion of the working fluid chamber;
a system fluid chamber on an opposing, second side of the main piston; and
a plurality of crooked vent paths configured to vent the residual chamber, each of the plurality of crooked vent paths defined within the vented accumulator reservoir and extending from a first opening to a second opening, wherein the first opening is arranged about a first axis and the second opening is arranged about a second axis misaligned with the first axis.

10. The vented accumulator reservoir of claim 9, including an actuator cylinder radially separating the working fluid chamber from the residual chamber.

11. The vented accumulator reservoir of claim 10, wherein the plurality of crooked vent paths are between the actuator cylinder and the housing, wherein the plurality of crooked vent paths are defined on at least one of the actuator cylinder or the housing.

12. The vented accumulator reservoir of claim 9, wherein the residual chamber is an annular chamber.

13. The vented accumulator reservoir of claim 9, including an actuator cylinder having a flange that establishes at least a portion of the plurality of crooked vent paths, the flange further having a lip configured to block contaminate ingress into the plurality of vent paths.

14. The vented accumulator reservoir of claim 9, wherein the working fluid chamber and the residual chamber are exclusively on the first side of the main piston, and the system fluid chamber is exclusively on the second side of the main piston.

15. A method of venting an accumulator reservoir to restrict ingress of contaminants comprising:
communicating fluid between a residual chamber within the accumulator reservoir and an outside environment through a plurality of crooked vent paths, the residual chamber separate from a system fluid chamber and a working fluid chamber the communicating in response to a volume of the residual chamber changing, the residual chamber disposed circumferentially about at least a portion of the working fluid chamber, each of the plurality of crooked vent paths extending from an inlet opening that is circumferentially continuous to an outlet opening that is circumferentially continuous, the inlet opening arranged about a first axis and the outlet opening arranged about a second axis that is misaligned with the first axis.

16. The method of claim 15, wherein the plurality of crooked vent paths are established within at least one of a housing, an actuator cylinder, or an actuator cap.

17. The method of claim 15, wherein the plurality of vent paths are arranged in a circular array.

18. The method of claim 15, including redirecting the fluid during the communicating from an axial direction, to a circumferential direction, and then to a radial direction.

19. The method of claim 15, including blocking at least one of the plurality of crooked vent paths and continuing the communicating through another of the plurality of crooked vent paths.

20. The method of claim 15, wherein the accumulator reservoir includes a feature configured to restrict flow of debris into the plurality of crooked vent paths.

21. The method of claim 15, wherein a piston is moveable along an axis and axially separates the entire system fluid chamber from the residual chamber.

22. The method of claim 15, wherein the plurality of crooked vent paths are defined on at least one of an actuator cylinder or a housing, wherein the plurality of crooked vent paths are disposed between the actuator cylinder and the housing.

* * * * *